United States Patent
Burchardt et al.

(10) Patent No.: US 11,820,046 B2
(45) Date of Patent: Nov. 21, 2023

(54) MODULAR MOLDING DEVICE, MOLDING SYSTEM AND METHOD FOR CREATING A MOLD FOR A BLADE SEGMENT OF A WIND TURBINE BLADE OF A WIND TURBINE

(71) Applicant: Siemens Gamesa Renewable Energy A/S, Brande (DK)

(72) Inventors: Claus Burchardt, Gistrup (DK); Allan Hurup, Nibe (DK); Mogens Nielsen, Aalborg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 340 days.

(21) Appl. No.: 16/829,828

(22) Filed: Mar. 25, 2020

(65) Prior Publication Data

US 2020/0307032 A1    Oct. 1, 2020

(30) Foreign Application Priority Data

Mar. 26, 2019    (EP) .................. 19165222

(51) Int. Cl.
  *B29C 33/30*  (2006.01)
  *F03D 1/06*   (2006.01)
  *B29L 31/08*  (2006.01)

(52) U.S. Cl.
  CPC .......... *B29C 33/302* (2013.01); *F03D 1/0675* (2013.01); *B29C 33/305* (2013.01); *B29L 2031/085* (2013.01)

(58) Field of Classification Search
  CPC ............... B29C 33/302; B29C 33/305; B29L 2031/085; Y02E 10/72; B29D 99/0025
  See application file for complete search history.

(56) References Cited

U.S. PATENT DOCUMENTS

2010/0024215 A1   2/2010   Torres Martinez
2012/0061024 A1   3/2012   Starke
(Continued)

FOREIGN PATENT DOCUMENTS

CN   107000329 A   8/2017
CN   107073757 A   8/2017
(Continued)

OTHER PUBLICATIONS

Extended European Search Report in related European Patent Application No. 19165222.1, dated Sep. 16, 2019. 11 pages.

*Primary Examiner* — Francisco W Tschen
*Assistant Examiner* — Elisa H Vera
(74) *Attorney, Agent, or Firm* — Schmeiser, Olsen & Watts LLP

(57) ABSTRACT

A modular molding device for creating a mold for a blade segment of a wind turbine blade of a wind turbine, the modular molding device including: a flexible support plate forming the mold for the blade segment, at least one bending apparatus including at least a first end and a second end, the at least one bending apparatus attached to the support plate and configured to bend the support plate from a first support plate shape to at least one second support plate shape, and at least one connection means, which is configured to removably connect the flexible support plate of the modular molding device with at least one connection of a flexible support plate of another modular molding device is provided. Moreover, a molding system and a method for creating a mold for a blade segment of a wind turbine blade of a wind turbine is also provided.

14 Claims, 2 Drawing Sheets

(56) References Cited

U.S. PATENT DOCUMENTS

| | | | |
|---|---|---|---|
| 2012/0187273 A1* | 7/2012 | Mironov | B29C 35/041 |
| | | | 416/223 R |
| 2014/0175703 A1* | 6/2014 | Percival, Jr. | B29C 53/04 |
| | | | 264/316 |
| 2014/0345789 A1 | 11/2014 | Eichler | |
| 2017/0274563 A1 | 9/2017 | De Waal Malefijt et al. | |
| 2017/0326758 A1 | 11/2017 | Andersen et al. | |
| 2019/0193304 A1* | 6/2019 | Davis | B29C 33/308 |
| 2020/0398459 A1 | 12/2020 | Kristian Lehmann Madsen et al. | |

FOREIGN PATENT DOCUMENTS

| | | |
|---|---|---|
| CN | 111433012 A | 7/2020 |
| DE | 102009030860 A1 | 2/2010 |
| EP | 1780120 A2 | 5/2007 |
| EP | 2316629 A1 | 5/2011 |
| EP | 2457707 A2 | 5/2012 |
| WO | 2012093136 A2 | 7/2012 |
| WO | 2013120583 A1 | 8/2013 |
| WO | 2016011655 A1 | 1/2016 |

* cited by examiner

MODULAR MOLDING DEVICE, MOLDING SYSTEM AND METHOD FOR CREATING A MOLD FOR A BLADE SEGMENT OF A WIND TURBINE BLADE OF A WIND TURBINE

CROSS-REFERENCE TO RELATED APPLICATIONS

This application claims priority to European Patent Application No. EP 19165222.1, having a filing date of Mar. 26, 2019, the entire contents of which are hereby incorporated by reference.

FIELD OF THE TECHNOLOGY

The following is directed to a modular molding device for creating a mold for a blade segment of a wind turbine blade of a wind turbine. Moreover, the following relates to a molding system and a method for creating a mold for a blade segment of a wind turbine blade of a wind turbine.

BACKGROUND

Typically, a wind turbine blade is constructed by joining at least two segments of a wind turbine blade. The blade segments are built and/or laminated in molds of different sizes up to the full length of a wind turbine blade. The molds for the blade segments are usually fixed to the building process of a specific blade shape or at least a specific blade segment shape. The molds tend to be not flexible in their shape and essentially cannot be adjusted. Especially in an early design phase of the geometry of a wind turbine blade it is essential to implement changes to the shape of blade segments in order to improve the design, which isn't possible or at least a very time-consuming process with the current state of the art molds for a blade segment of a wind turbine blade. It is therefore disadvantageous of current molds to not be able to produce any desired shape of a wind turbine blade segment but to be limited to a single shape.

SUMMARY

Therefore, an aspect of the present invention relates a modular molding device, a molding system and method for creating a mold for a blade segment of a wind turbine blade of a wind turbine that do not have these drawbacks or at least partially do not have these drawbacks. In particular, it is the aspect of the present invention to provide a modular molding device and a molding system that provide a flexible and modular construction and the aforementioned method that allows for a flexible creation of a mold for a blade segment with low costs and little time to implement changes to the shape of the mold for a blade segment of a wind turbine blade of a wind turbine.

Another aspect of the present invention relates to a modular molding device for creating a mold for a blade segment of a wind turbine blade of a wind turbine, the modular molding device comprising:
- a flexible support plate forming the mold for the blade segment,
- at least one bending apparatus comprising at least a first end and a second end, the at least one bending apparatus attached to the support plate and configured to bend the support plate from a first support plate shape to at least one second support plate shape, and
- at least one connection means, which is configured to removably connect the flexible support plate of the modular molding device with at least one connection means of a flexible support plate of another modular molding device.

The mold of the embodiment of the present invention is to be understood as a helping means to construct and/or laminate a blade segment of a wind turbine blade on and/or in. The mold is formed on the top side of the support plate and by the surface of the support plate. A blade segment of a wind turbine blade of a wind turbine can be understood as a portion, in particular a half, of the blade of a wind turbine blade of a wind turbine. The support plate is constructed as a flexible surface consisting of a single or a combination of a variety of surfaces. The blade segment can be a shell segment of the wind turbine blade.

A bending apparatus can be a flexible arm, a controlled spring, a hydraulic or pneumatic cylinder or another apparatus configured to bend the support plate from a first support plate shape to at least one second support plate shape. A bending apparatus can also comprise an attachment-means and/or a joint with at least one rotational degree of freedom, whereby at least one of the at least one rotational degree of freedom is oriented with respect to a longitudinal axis of the support plate. The attachment-means is arranged in the center of the support plate with respect to the width axis. The attachment-means can also be arranged distanced from the center in order to achieve different bending results. The attachment means is fixed in its position with respect to the height axis and thereby provides a fixed counterpart for the bending by the at least one bending apparatus. In between or outside of the first support plate shape and the second support plate shape a various amount of further support plate shapes can exist. A first plate shape is a straight, in particular a flat, shape of the support plate. A second plate shape is a bend shape of the support plate. The support plate is bend around or along a longitudinal axis of the modular molding device. The modular molding device comprises a rectangular footprint. The longitudinal axis runs along the longer sides of the modular molding device. The longitudinal axis may be aligned parallel and inside, next to or distanced to the modular molding device.

A connection means of the embodiment of the present invention can provide at least one of the following two functionalities: a most basic embodiment of the connection means provides an alignment of the connection means of a first modular molding device with the connection means of a second modular molding device. Thereby the connection means enable two modular molding devices to be connected to each other while the flexible support plates form a seamless, or close to seamless, transition due to the alignment of the connection means of the first modular molding device and the connection means of the second modular molding device. A connection device can further include an interlocking means to removably connect the flexible support plate of the modular molding device with at least one connection means of a flexible support plate of another modular molding device. An interlocking means can be constructed as a ratchet, a splint, a spring lock, a snap lock or as a different interlocking means. A modular molding device designed that way is particular advantageous because it provides the base for a modular system that allows for a flexible creation of a mold for a blade segment with low costs and little time to implement changes to the shape of the mold with flexible length for a blade segment of a wind turbine blade of a wind turbine. The length of the mold can be easily adjusted by adding of removing further modular molding devices. The shape of the mold can easily be adjusted in the desired amount by means of the bending apparatus without the need of a new mold.

According to an embodiment of the invention it is advantageous that the first end of the at least one bending apparatus is attached to the support plate by means of at least one first bending apparatus joint having at least one rotational degree of freedom, whereby at least one of the at least one rotational degree of freedom is oriented with respect to a longitudinal axis of the support plate. When bending the flexible support plate at at least one spot the flexible support plate is likely to change the orientation and/or the angle of the surface of the support plate in respect to the first bending apparatus. It is advantageous to implement a first bending apparatus joint to allow for at least one rotational degree of freedom for this movement of the support plate while it is getting bent.

According to another embodiment of the present invention it is advantageous that the second end of the at least one bending apparatus comprises at least one second bending apparatus joint having at least one rotational degree of freedom, whereby at least one of the at least one rotational degree of freedom is oriented with respect to a longitudinal axis of the support plate. A first end and a second end of the at least one bending apparatus are on opposite sides of the bending apparatus. It is advantageous to provide at least one second bending apparatus joint on a second end of the bending apparatus in order to provide a joint with at least one rotational degree of freedom, on a far side of the bending apparatus distanced from the flexible support plate. With a modular molding device designed in that way it is advantageous to have a second end of the bending apparatus mounted to some sort of base by means of the second bending apparatus joint.

In another embodiment of the present invention, the modular molding device comprises a torsion-resistant chassis, particularly a movable chassis. An aforementioned base of the embodiment of the present invention can be understood as a torsion-resistant chassis. Such chassis can be constructed as a frame, a framework, a carriage or as a different chassis. The chassis is equipped with wheels or other means in order to provide mobility to the chassis. The wheels are distanced apart as much as the footprint of the modular molding device allows for to provide a most stable chassis. A torsion-resistant chassis can be understood as a chassis that allows for the bending of the surface plate by means of the at least one bending apparatus without bending the chassis. A modular molding device designed that way is particular advantageous because it provides a mobile base to mount the flexible support plate of the modular molding device to.

According to another embodiment of the invention it is advantageous that the second end of the at least one bending apparatus is attached to the chassis. A modular molding device designed that way is particular advantageous because it provides a base to mount the bending apparatus of the modular molding device to.

According to another embodiment of the present invention it is advantageous that the bending apparatus is attached to a bottom side of the support plate, whereby the bottom side of the support plate is opposite to the top side of the support plate. A modular molding device designed that way is particular advantageous because it allows for attaching the bending apparatus on the bottom side of the support plate and thereby does not obstruct any space of the mold on the top side of the support plate.

According to another embodiment of the present invention it is advantageous that the at least one connection means comprises a protruded connection means and/or a recessed connection means, wherein the protruded connection means of a first modular molding device is configured to be aligned and/or connected to the recessed connection means of a second modular molding device. Connection means, as described before, can comprise at least one of the two functionalities: alignment and interlocking. A connection means designed according to this embodiment is especially advantageous because it provides a very easy solution for each of the two functionalities of the connection means. A protruded connection means can easily be aligned to a recessed connection means and with little changes to either one of the connection means the interlocking functionality can be added. Thereby a seamless or close to seamless joint of two modular molding devices is made possible due to the inventive connections means of the modular molding device. The connection means can comprise an interlocking mechanism, be movable or fixed.

According to another embodiment of the present invention it is advantageous that the at least one protruded connection means of a first modular molding device is formed as a pin and the at least one recessed connection means of a second modular molding device is formed as a slot, wherein the slot is configured to be aligned and/or connected to the pin. A pin and a slot are an easy to produce embodiment of the inventive connection means with little effort for costs and time. A pin can be machined round, rectangular, hexagonal or any other desired shape which may be easily inserted into a respective slot. The pin can comprise an interlocking mechanism, be movable or fixed.

According to another embodiment of the present invention it is advantageous that the at least one connection means is arranged at the bottom side of the support plate, wherein the bottom side of the support plate is opposite to the top side of the support plate. A modular molding device designed that way is particular advantageous because it allows for attaching the connection means on the bottom side of the support plate and thereby does not obstruct any space of the mold on the top side of the support plate.

According to another embodiment of the present invention it is advantageous that the at least one connection means is arranged at a front face of the support plate, wherein the front face is angled, in particular 90° angled to the longitudinal axis of the support plate. The idea of the embodiment of the present invention is to provide a modular molding device for creating a mold for a blade segment of a wind turbine blade. As given by the basic design and shape of a wind turbine blade the molds tend to be much longer in one direction (length) than they are wide in the other direction (width). When divided into segments, the joints are to be placed on the short sides of the modular molding devices, along the length of the mold. Thereby the connections means should be placed on these sides as well. Of course, the modular molding devices can be constructed with a square footprint as well. Though longer modular molding devices tend to be more practicable in reality and reduce the costs.

According to another embodiment of the present invention it is advantageous that at least one limit stop is arranged on and/or connected to the support plate, particularly on/to the top side of the support plate. A limit stop, particularly on top of the support plate can be a very helpful means for the production process of a blade segment and/or for aligning means to produce the blade segments.

According to another embodiment of the present invention it is advantageous that the modular molding device further comprises a heating apparatus for heating and/or a vacuum bagging assembly. The modular molding device may comprise further assemblies or attachments for providing help to the construction process of creating a blade segment of a wind turbine blade. A vacuum bagging assembly is a very advantageous way to provide a consistent pressure on top of and/or to a laminate for a blade segment. The modular molding device can further comprise holes and/or profiles for attachments, measurement means and/or clamps. A modular molding device designed that way is particularly advantageous because it combines further means to the modular molding device and thereby makes the process of production easier with less effort in time and costs.

According to a second aspect of the embodiment of the present invention, the problem is solved by a molding system comprising at least two modular molding devices according to the first aspect, wherein the at least two modular molding devices are connected by means of the at least one connection means each. Thus, a molding system in accordance with the embodiment of the present invention has the same advantages as described in detail above. A molding system designed in this way is particularly advantageous because it allows for a flexible creation of a mold for a blade segment with low costs and little time to implement changes to the shape of the mold with flexible length for a blade segment of a wind turbine blade of a wind turbine. The length of the mold can be easily adjusted by adding or removing further modular molding devices according to the first aspect.

According to a third aspect of the embodiment of the present invention, the problem is solved by a method for creating a mold for a blade segment of a wind turbine blade of a wind turbine, with at least two modular molding devices according to the first aspect, the method comprising the steps of:

Connecting the at least two modular molding devices by aligning and/or connecting the at least one connection means of a first modular molding device with the at least one connection means of a second modular molding device to create a molding system according to a second aspect.

As described before, the connection of the at least two modular molding devices can either comprise an alignment and/or an interlocking of the two modular molding devices in order to provide a seamless or close to seamless transition between the support plates of the two modular molding devices. It is further advantageous that the method comprises the step of bending at least one of the flexible support plates of the at least two modular molding devices by means of the at least one bending apparatus per modular molding device in order to create a mold for a blade segment with the at least two support plates.

Thus, a method for creating a mold in accordance with the embodiment of the present invention has the same advantages as described in detail above. A method for creating a mold designed in this way is particularly advantageous because it allows for a flexible creation of a mold for a blade segment with low costs and little time to implement changes to the shape of the mold with flexible length for a blade segment of a wind turbine blade of a wind turbine. The length of the mold can be easily adjusted by adding of removing further modular molding devices according to the first aspect.

BRIEF DESCRIPTION

Some of the embodiments will be described in detail, with reference to the following figures, wherein like designations denote like members, wherein.

Elements with the same function and effectiveness are denoted each in FIGS. 1 to 3 with the same reference numbers.

DETAILED DESCRIPTION

Figure 1:
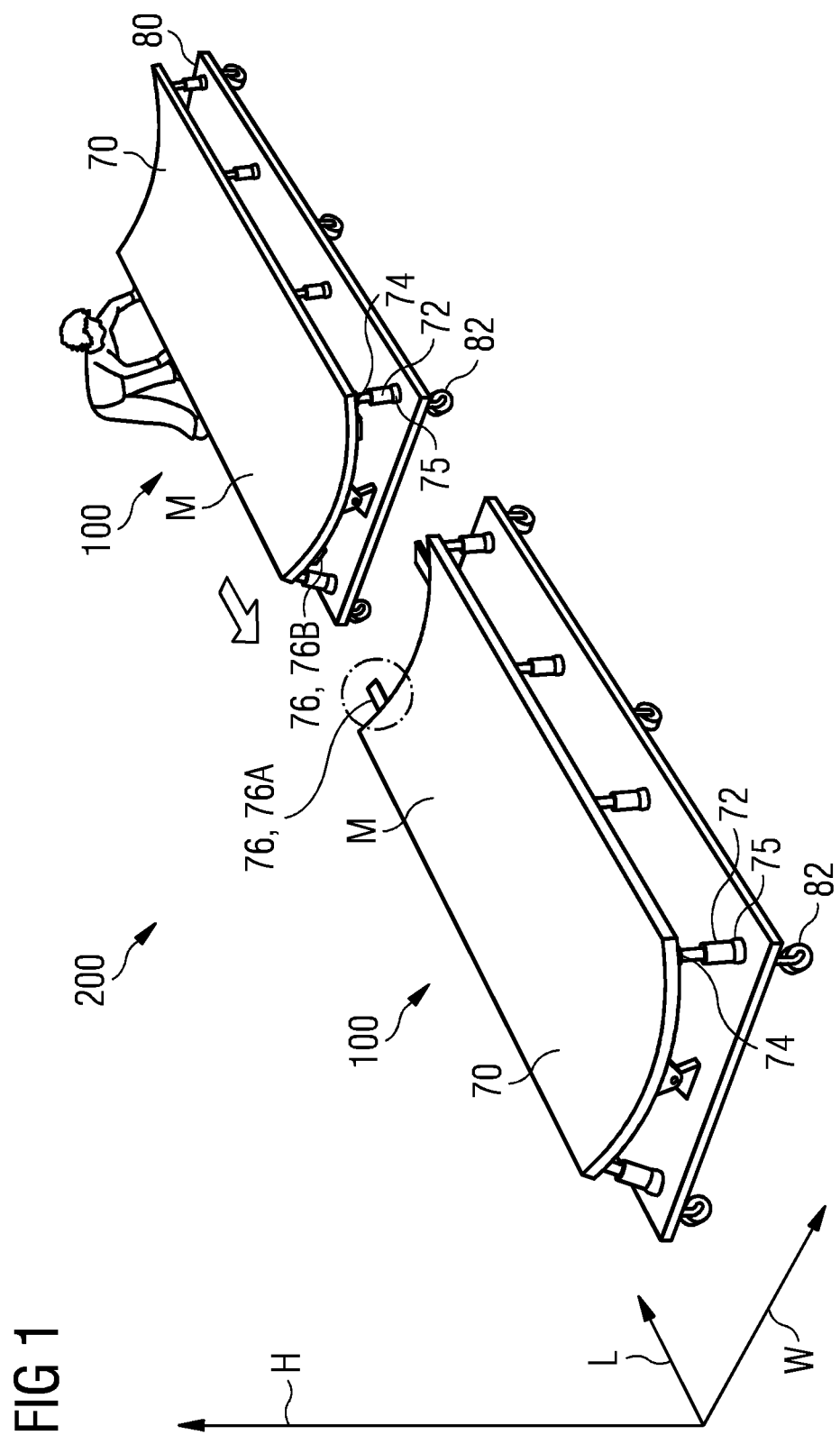
FIG. 1 depicts a schematic perspective view of a molding system with two modular molding devices for creating a mold for a blade segment of a wind turbine blade of a wind turbine.

In FIG. 1 a molding system 200 with two modular molding devices 100 for creating a mold M for a blade segment 18 (not shown) of a wind turbine blade 10 (not shown) of a wind turbine 1 (not shown) is shown. The support plates 70 of the modular molding devices 100 are connected to a chassis 80 each. The connection between the chassis 80 and the flexible support plates 70 is achieved by the numerous bending apparatuses 72, which comprise a first bending apparatus joint 74 and a second bending apparatus joint 75 each in order to allow for flexible bending of the support plates 70 while still safely connecting the support plate 70 to the chassis 80. The chassis 80 is mounted on wheels 82 to allow for an easy arrangement and extension of the molding system 200 by adding or removing further modular molding devices 100. To connect the modular molding devices 100 to one another they comprise connection means 76, 76A, 76B each. In FIG. 1 only the two connection means 76, 76A, 76B are shown per modular molding device. Further connection means 76, 76A, 76B can be implemented, especially on the opposite sides of the ones shown in FIG. 1. Attachment-means of the bending apparatus 72 are arranged in the center or close to the center of the support plates 70 with respect to the width axis W. The attachment means of the bending apparatus 72 according to this embodiment are fixed in their position with respect to the height axis H and thereby provide a counterpart for the bending by the bending apparatuses 72.

Figure 2:
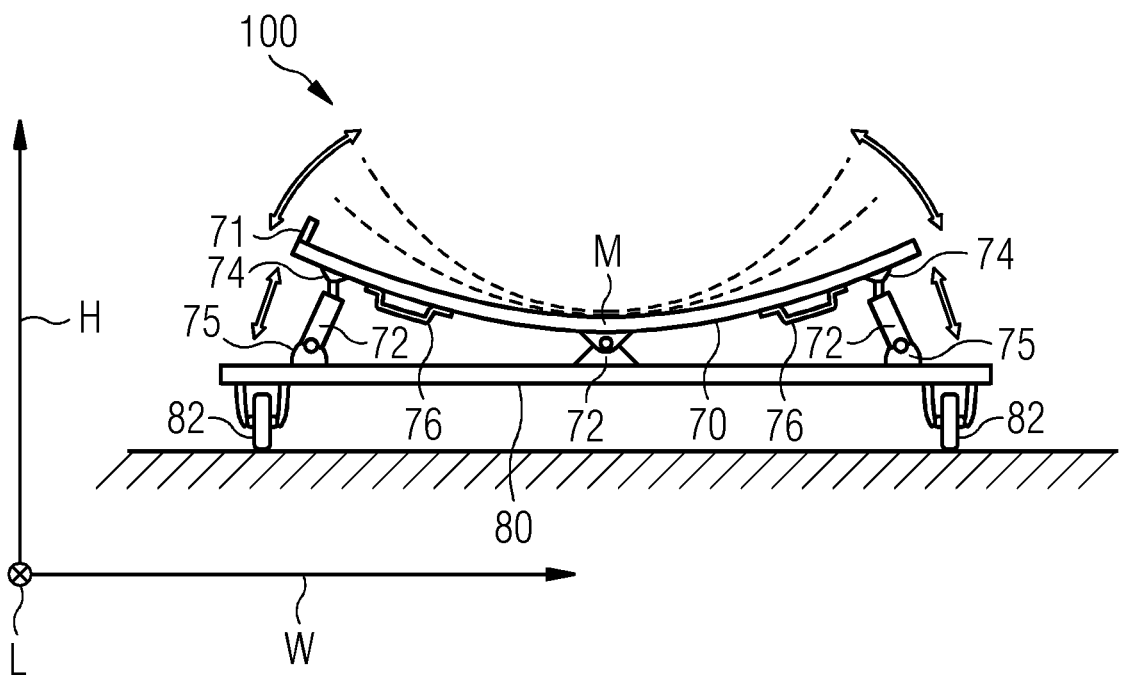
FIG. 2 depicts a schematic side view of a modular molding device with a mobile chassis, two connection means and a variation of support plate shapes.

In FIG. 2 a modular molding device 100 with a mobile chassis 80 with wheels 82, two connection means 76 and a variation of support plate shapes for the support plate 70 are shown. The attachment-means of the bending apparatus 72 is arranged off center with respect to the width axis W to achieve a different bending result or shape compared to a centered attachment-means of the bending apparatus 72. The top side of the support plate 70 comprises a stop level 71 to simplify for example the alignment of means for creating the blade segment 18 (not shown) for the wind turbine blade 1 (not shown). A modular molding device 100 designed that way is particular advantageous because it provides the base for a modular system 200 that allows for a flexible creation of a mold M for a blade segment 18 (not shown) with low costs and little time to implement changes to the shape of the mold M with flexible length for a blade segment 18 (not shown) of a wind turbine blade 1 (not shown) of a wind turbine 10 (not shown).

Figure 3:
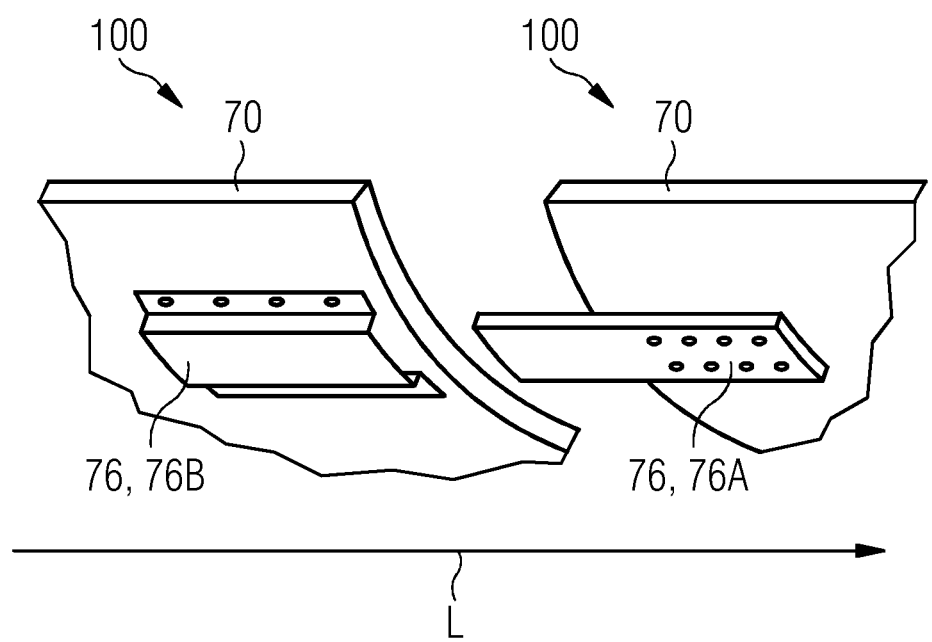
FIG. 3 depicts a schematic detailed view of the connections means of two modular molding devices with a protruded connection means and a recessed connection means.

In FIG. 3 a close view of the connections means 76, 76A, 76B of two modular molding devices 100 with a protruded connection means 76A and a recessed connection means 76B is shown. The connection means 76, 76A, 76B are arranged on the bottom side of each support plate 70. The shown connection means 76, 76A, 76B of the embodiment of the present invention provide at least an alignment of the connection means 76, 76A of a first modular molding device 100 with the connection means 76, 76B of a second modular molding device 100. Thereby the connection means 76, 76A, 76B enable two modular molding devices 100 to be connected to each other while the flexible support plates 70 form a seamless, or close to seamless, transition due to the alignment of the connection means 76, 76A, 76B of the first modular molding device 100 and the connection means 76, 76A, 76B of the second modular molding device 100.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A modular molding device for creating a mold for a blade segment of a wind turbine blade of a wind turbine, the modular molding device comprising:
    a flexible support plate forming the mold for the blade segment;
    at least one bending apparatus comprising at least a first end and a second end, the at least one bending apparatus attached to the flexible support plate at a location off-center with respect to a width axis, and configured to bend the flexible support plate from a first support plate shape to at least one second support plate shape; and
    a bending apparatus attached to the flexible support plate at a location proximate a center of the width axis, permanently fixed in position with respect to a height axis to provide a fixed counterpart for a bending by the at least one bending apparatus from the first support plate shape to the at least one second support plate shape;
    at least one connection means, which is configured to removably connect the flexible support plate of the modular molding device with at least one connection means of a flexible support plate of another modular molding device.

2. The modular molding device according to claim 1, wherein the first end of the at least one bending apparatus is attached to the flexible support plate by means of at least one first bending apparatus joint having at least one rotational degree of freedom, whereby at least one of the at least one rotational degree of freedom is oriented with respect to a longitudinal axis of the flexible support plate.

3. The modular molding device according to claim 1, wherein the second end of the at least one bending apparatus comprises at least one second bending apparatus joint having at least one rotational degree of freedom, whereby at least one of the at least one rotational degree of freedom is oriented with respect to a longitudinal axis of the flexible support plate.

4. The modular molding device according to claim 1, further comprising a torsion-resistant chassis.

5. The modular molding device according to claim 4, wherein the second end of the at least one bending apparatus is attached to the torsion-resistant chassis.

6. The modular molding device according to claim 1, wherein the at least one bending apparatus is attached to a bottom side of the flexible support plate, whereby the bottom side of the flexible support plate is opposite to a top side of the flexible support plate.

7. The modular molding device according to claim 1, wherein at least one connection means comprises a protruded connection means and/or a recessed connection means, wherein the protruded connection means of a first modular molding device is configured to be aligned and/or connected to the recessed connection means of a second modular molding device.

8. The modular molding device according to claim 7, wherein at least one protruded connection means of a first modular molding device is formed as a pin and the at least one recessed connection means of a second modular molding device is formed as a slot, wherein the slot is configured to be aligned and/or connected to the pin.

9. The modular molding device according to claim 1, wherein at least one connection means is arranged at a bottom side of the flexible support plate, wherein the bottom side of the flexible support plate is opposite to a top side of the flexible support plate.

10. The modular molding device according to claim 1, wherein at least one connection means is arranged at a front face of the flexible support plate, wherein the front face is angled to a longitudinal axis of the flexible support plate.

11. The modular molding device according to claim 1, wherein at least one limit stop is arranged on and/or connected to the flexible support plate on/to a top side of the flexible support plate.

12. The modular molding device according to any claim 1 further comprising a vacuum bagging assembly.

13. A molding system comprising at least two modular molding devices according to claim 1, wherein the at least two modular molding devices are connected by means of an at least one connection means each.

14. A method for creating a mold for a blade segment of a wind turbine blade of a wind turbine, with at least two modular molding devices according to claim 1, the method comprising:
    connecting the at least two modular molding devices by aligning and/or connecting the at least one connection means of a first modular molding device with the at least one connection means of a second modular molding device to create a molding system.

* * * * *